US012399034B2

(12) United States Patent
Kapil

(10) Patent No.: US 12,399,034 B2
(45) Date of Patent: Aug. 26, 2025

(54) ROUTING OF AN AUTONOMOUS VEHICLE IN A FLOOD CONDITION

(71) Applicant: GM Cruise Holdings LLC, San Francisco, CA (US)

(72) Inventor: Swarnakshi Kapil, Sunnyvale, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 125 days.

(21) Appl. No.: 18/094,647

(22) Filed: Jan. 9, 2023

(65) Prior Publication Data

US 2024/0230370 A1   Jul. 11, 2024

(51) Int. Cl.
*G01C 21/00* (2006.01)
*B60W 40/02* (2006.01)

(52) U.S. Cl.
CPC ......... *G01C 21/3885* (2020.08); *B60W 40/02* (2013.01); *G01C 21/3841* (2020.08); *B60W 2420/408* (2024.01); *B60W 2555/20* (2020.02); *B60W 2556/40* (2020.02); *B60W 2556/45* (2020.02)

(58) Field of Classification Search
CPC .......... B60W 40/02; B60W 2420/408; B60W 2555/20; B60W 2556/40; B60W 2556/45; G01C 21/00; G01C 21/3461; G01C 21/3694; G01C 21/3841; G01C 21/3885
USPC ....................................................... 701/400
See application file for complete search history.

(56) References Cited

U.S. PATENT DOCUMENTS

| 9,110,196 B2 * | 8/2015 | Urmson ................. G01S 17/42 |
| 9,207,323 B2 * | 12/2015 | Zhu .......................... G01S 17/86 |
| 9,499,172 B2 * | 11/2016 | Urmson ................ B60W 40/06 |

(Continued)

FOREIGN PATENT DOCUMENTS

| AU | 2021229238 A1 * | 10/2021 | ........... G06V 20/188 |
| CN | 104768822 A * | 7/2015 | ............ B60W 30/18 |

(Continued)

OTHER PUBLICATIONS

E. B. Panganiban and J. C. Dela Cruz, "Rain water level information with flood warning system using flat clustering predictive technique," TENCON 2017-2017 IEEE Region 10 Conference, Penang, Malaysia, 2017, pp. 727-732, doi: 10.1109/TENCON.2017. 8227956. (https://ieeexplore.ieee.org/document/8227956) (Year: 2017).*

(Continued)

*Primary Examiner* — Atul Trivedi
(74) *Attorney, Agent, or Firm* — Honigman LLP; Matthew H. Szalach; Jonathan P. O'Brien

(57) ABSTRACT

Systems and techniques are provided for routing an autonomous vehicle (AV) in a flood condition. An example method can include collecting sensor data from one or more AVs, wherein the sensor data includes measurements associated with a level of precipitation in one or more locations; receiving map data descriptive of an elevation of ground at the one or more locations; determining that the level of precipitation in the one or more locations relative to the elevation of ground at the one or more locations is higher than a threshold; and transmitting an alert signal to the one or more AVs, the alert signal notifying of a flood condition at the one or more locations.

18 Claims, 5 Drawing Sheets

(56) References Cited

U.S. PATENT DOCUMENTS

| | | | | |
|---|---|---|---|---|
| 9,632,210 | B2* | 4/2017 | Zhu | G01S 17/87 |
| 10,255,782 | B1* | 4/2019 | Ghannam | G08B 21/20 |
| 11,046,271 | B2* | 6/2021 | Lerner | B60W 50/0098 |
| 11,441,916 | B1* | 9/2022 | Konrardy | G01C 21/343 |
| 11,449,946 | B1* | 9/2022 | Gutsell | G06N 20/00 |
| 11,594,017 | B1* | 2/2023 | Gupta | G01S 15/931 |
| 11,959,745 | B2* | 4/2024 | Gray, Jr. | H04W 4/38 |
| 2014/0081507 | A1* | 3/2014 | Urmson | B60W 40/06 701/28 |
| 2014/0081573 | A1* | 3/2014 | Urmson | G01S 17/42 356/600 |
| 2014/0307247 | A1* | 10/2014 | Zhu | B60W 40/064 342/54 |
| 2014/0336935 | A1* | 11/2014 | Zhu | G01N 21/4738 702/3 |
| 2017/0025002 | A1* | 1/2017 | Claudel | G08G 1/096844 |
| 2018/0004211 | A1* | 1/2018 | Grimm | G05D 1/0066 |
| 2018/0348753 | A1* | 12/2018 | Ortiz Gonzalez | B60W 40/02 |
| 2019/0316309 | A1* | 10/2019 | Wani | G06F 3/0484 |
| 2019/0376807 | A1* | 12/2019 | Iagnemma | G01C 21/3461 |
| 2020/0130622 | A1* | 4/2020 | Lerner | G01C 21/3697 |
| 2021/0213976 | A1* | 7/2021 | Salter | G05D 1/0291 |
| 2022/0157178 | A1 | 5/2022 | Grace et al. | |
| 2022/0164911 | A1* | 5/2022 | Stumpf | H04W 4/024 |
| 2022/0188866 | A1* | 6/2022 | Farmer | G06Q 10/02 |
| 2022/0198196 | A1* | 6/2022 | Beaurepaire | G06V 40/103 |
| 2023/0100961 | A1* | 3/2023 | Pan | G01C 21/3629 701/24 |
| 2023/0182742 | A1* | 6/2023 | Han | B60W 40/02 701/23 |
| 2023/0236317 | A1* | 7/2023 | Fina | G01S 7/412 342/26 B |
| 2024/0107635 | A1* | 3/2024 | Gu | G01S 7/497 |
| 2024/0111057 | A1* | 4/2024 | Woll | G01S 7/4802 |
| 2024/0118424 | A1* | 4/2024 | Shane | G01S 17/931 |
| 2024/0149881 | A1* | 5/2024 | Villegas | B60W 60/001 |
| 2024/0166213 | A1* | 5/2024 | Ahmed | B60W 40/068 |
| 2024/0230370 | A1* | 7/2024 | Kapil | G08G 1/0133 |

FOREIGN PATENT DOCUMENTS

| | | | | |
|---|---|---|---|---|
| CN | 109849923 | A * | 6/2019 | B60W 30/18009 |
| CN | 110058240 | A * | 7/2019 | B60W 30/09 |
| CN | 118535871 | A * | 8/2024 | |
| CN | 118799767 | A * | 10/2024 | |
| CN | 119672566 | A * | 3/2025 | |
| CN | 119737932 | A * | 4/2025 | |
| CN | 119780000 | A * | 4/2025 | |
| DE | 102021123436 | A1 * | 3/2023 | G06Q 10/02 |
| EP | 4064238 | A1 * | 9/2022 | B60W 50/0097 |
| KR | 20210090720 | A * | 7/2021 | B60W 40/02 |
| RU | 2686159 | C2 * | 4/2019 | B64C 39/02 |
| WO | WO-2022229706 | A1 * | 11/2022 | |

OTHER PUBLICATIONS

Lo SW, Wu JH, Lin FP, Hsu CH. Visual Sensing for Urban Flood Monitoring. Sensors (Basel). Aug. 14, 2015; 15(8):20006-29. doi: 10.3390/s150820006. PMID: 26287201; PMCID: PMC4570407. (Year: 2015).*

Panganiban, et al., "Rain water level information with flood warning system using flat clustering predictive technique," TENCON 2017-2017 IEEE Region 10 Conference, Penang, Malaysia, 2017, pp. 727-732, doi: 10.1109/TENCON.2017.8227956. (https://ieeexplore.ieee.org/document/8227956) (Year: 2017).*

Lo, et al. Visual Sensing for Urban Flood Monitoring. Sensors (Basel). Aug. 14, 2015; 15(8):20006-29. doi: 10.3390/s150820006. PMID: 26287201; PMCID: PMC4570407. (https://www.ncbi.nlm.nih.gov/pmc/articles/PMC4570407/) (Year: 2015).*

* cited by examiner

ROUTING OF AN AUTONOMOUS VEHICLE IN A FLOOD CONDITION

BACKGROUND

1. Technical Field

The present disclosure generally relates to autonomous vehicles and, more specifically, to routing of an autonomous vehicle in a flood condition.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
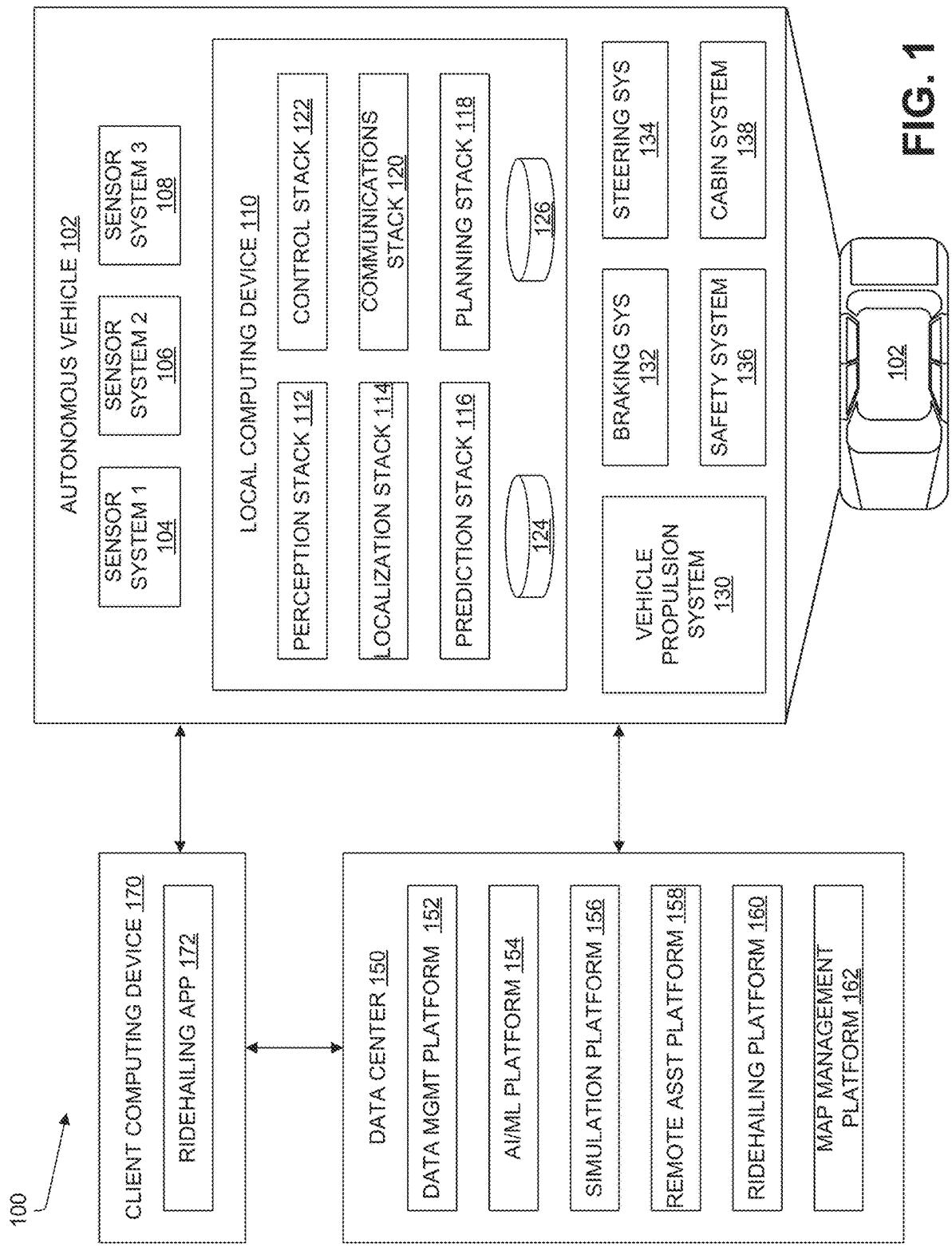
FIG. 1 illustrates an example system environment that can be used to facilitate autonomous vehicle (AV) dispatch and operations, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

As previously explained, autonomous vehicles (AVs) can include various sensors, such as a camera sensor, a Light Detection and Ranging (LiDAR) sensor, a Radio Detection and Ranging (RADAR) sensor, an audio sensor, amongst others, which the AVs can use to collect data and measurements that the AVs can use for operations such as navigation. The sensors can provide the data and measurements to an internal computing system of the AV, which can use the data and measurements to control a mechanical system of the AV, such as a vehicle propulsion system, a braking system, or a steering system.

Heavy rainfalls associated with floods may be predicted and detected using satellites, lightning observing systems, and rain gauges. Based on such predictions and detection, a flood warning can be provided to the public through public warning systems (e.g., radio or television broadcasters, wireless emergency alerts, etc.). For example, a flash flood warning can be issued to alert the public that a flash flood is imminent or occurring in the warned area or region. However, even a small road segment within the same region can have varying elevations that would result in a different road condition in a flood event. Also, floods can be progressing at a rapid pace in some locations. Therefore, it can be difficult and complicated to get accurate predictions and detailed real-time information on a potential, imminent, or occurring flood condition. Accurate and timely detection of any potential or progressing flood condition (e.g., detection of a change in a water level on road) is important to provide real-time warnings and route vehicles (and passengers) to a safe spot to ensure the safe operation of the vehicles and the safety of passengers.

Described herein are systems, apparatuses, processes (also referred to as methods), and computer-readable media (collectively referred to as "systems and techniques") for routing and/or dispatching an AV in a flood condition. In some examples, the systems and techniques described herein can predict and/or determine a potential, imminent, or occurring flood condition on road in real time by leveraging data from various sources such as sensor data collected from one or more AVs, map data, absorbability data, historical data, or any applicable data associated with weather or meteorological data. Further, the systems and techniques described herein can, based on the predictions and detection of a flood condition, route/re-route an AV to avoid a location or a spot that has a high level of precipitation that may affect or endanger the operation of the AV. For example, the systems and techniques described herein can transmit an alert signal to an AV to notify a flood condition, for example, in a visualization of the flood condition on a map that defines a zone or an area in which an AV should not travel.

In some aspects, the systems and techniques described herein can transmit an alert signal to a user who may be associated with an AV. For example, an alert signal to a user can provide an updated map in real time that shows a zone or an area that is affected by a flood event (e.g., a visualization of the updated map on a display of a wireless device associated with the user). Further, in response to a determination that a user is located within a threshold distance from a flooded area, the systems and techniques described herein can dispatch an AV to help the user evacuate and move to a safe spot.

FIG. 1 is a diagram illustrating an example autonomous vehicle (AV) environment 100, according to some examples of the present disclosure. One of ordinary skill in the art will understand that, for the AV environment 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridehailing service (e.g., a ridesharing service), a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridehailing/ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridehailing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridehailing/ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridehailing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridehailing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridehailing platform 160 can interact with a customer of a ridehailing service (e.g., a ridesharing service) via a ridehailing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridehailing application 172. The client computing device 170 can be a customer's mobile computing device or a computing device integrated with the AV 102 (e.g., the local computing device 110). The ridehailing platform 160 can receive requests to pick up or drop off from the ridehailing application 172 and dispatch the AV 1102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some embodiments, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridehailing platform 160 may incorporate the map viewing services into the ridehailing application 172 (e.g., client application) to enable passengers to view the AV 102 in transit en route to a pick-up or drop-off location, and so on.

While the autonomous vehicle 102, the local computing device 110, and the AV environment 100 are shown to include certain systems and components, one of ordinary skill will appreciate that the autonomous vehicle 102, the local computing device 110, and/or the AV environment 100 can include more or fewer systems and/or components than those shown in FIG. 1. For example, the autonomous vehicle 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 5.

Figure 2:
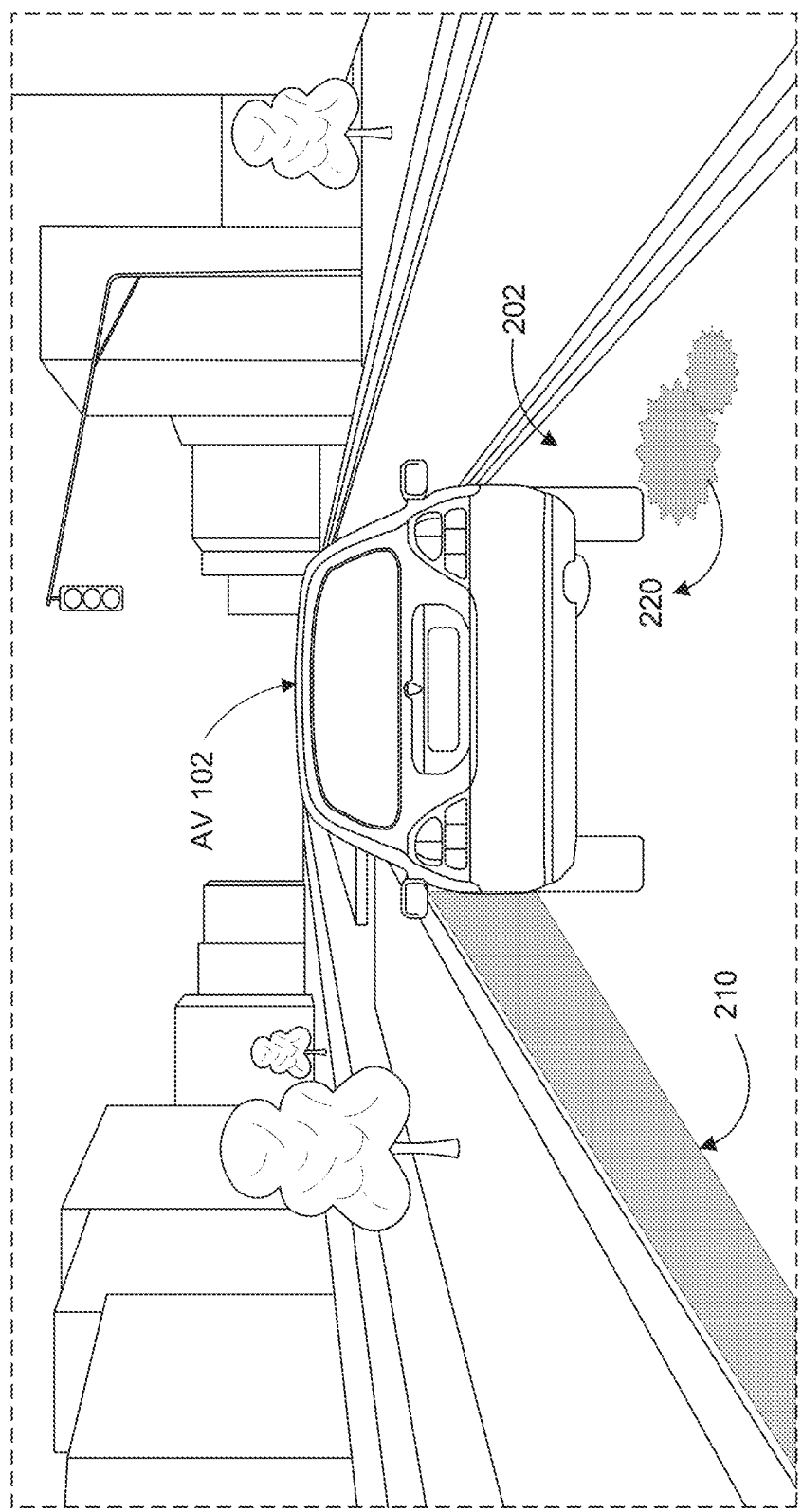
FIG. 2 illustrates a diagram that includes an AV detecting a flood condition, according to some examples of the present disclosure.

FIG. 2 illustrates a diagram that includes an AV (e.g., AV 102) detecting a flood condition. As noted previously, while AV 102 navigates on a road, various sensors (e.g., sensor systems 104-108 as illustrated in FIG. 1) of AV 102 can capture and collect sensor data that can be used to measure, describe, and/or depict one or more aspects of an environment around AV 102. More specifically, the sensor data can include measurements associated with a level of precipitation (e.g., a water level or an amount of precipitation) on the ground such as on a road, a street, a highway, and/or any other surface on which AV 102 may operate. For example, a RADAR sensor can produce detailed precipitation information by measuring radar waves that bounce off of precipitation. Examples of sensors can further include a camera, a LiDAR, an ambient light sensor, an infrared sensor, a rain sensor, a rain gauge, an ultrasonic sensor, and so forth. Those skilled in the art will recognize that the systems and techniques described herein may be implemented using a different number of sensors that are mounted on AV 102 as well as different types and/or different positions of sensors that may be configured to detect a precipitation condition and/or measure a level of precipitation on a road in real-time.

In some examples, the systems and techniques described herein can, based on the sensor data, determine a level of precipitation and/or a progression rate of precipitation in one or more locations or spots around AV 102. In the illustrative example of FIG. 2, as AV 102 navigates on a road, one or more sensors of AV 102 (e.g., sensor systems 104-108) can detect a precipitation condition (e.g., rain, drizzle, hail, snow, etc.) and measure the level of precipitation on the road (e.g., ground surface 202). In some examples, AV 102 can identify one or more locations or spots on the road where the level of precipitation is higher than a precipitation threshold. For example, AV 102 can detect excess water on a street gutter 210 below a curb on the left side of the road. In another example, AV 102 can detect the level of precipitation in one or more potholes (e.g., potholes 220). In some aspects, if a level or amount of precipitation on the road (e.g., ground surface 202), on street gutter 210, and/or potholes 220 exceeds a predetermined precipitation threshold, the systems and techniques described herein can identify street gutter 210 and potholes 220 as a location affected by or in a flood condition.

In some examples, based on the detection of one or more spots that have a level of precipitation higher than a precipitation threshold, the systems and techniques described herein can predict and detect a potential, imminent, or occurring flood condition at certain locations and/or spots. Also, rather than estimating or measuring rainfalls at one place and generalizing the flood condition for a nearby area, the systems and techniques of the present technology can identify a location, spot, or portion of a road segment at a small scale with detailed predictions and detection. For example, AV 102 can be routed to a lane that may be drivable and has a low level of precipitation (e.g., level of precipitation is below a threshold value) and avoid a lane that has a spot or spots (e.g., potholes 220) with higher levels of precipitation rather than making a detour to avoid the entire area.

Figure 3:
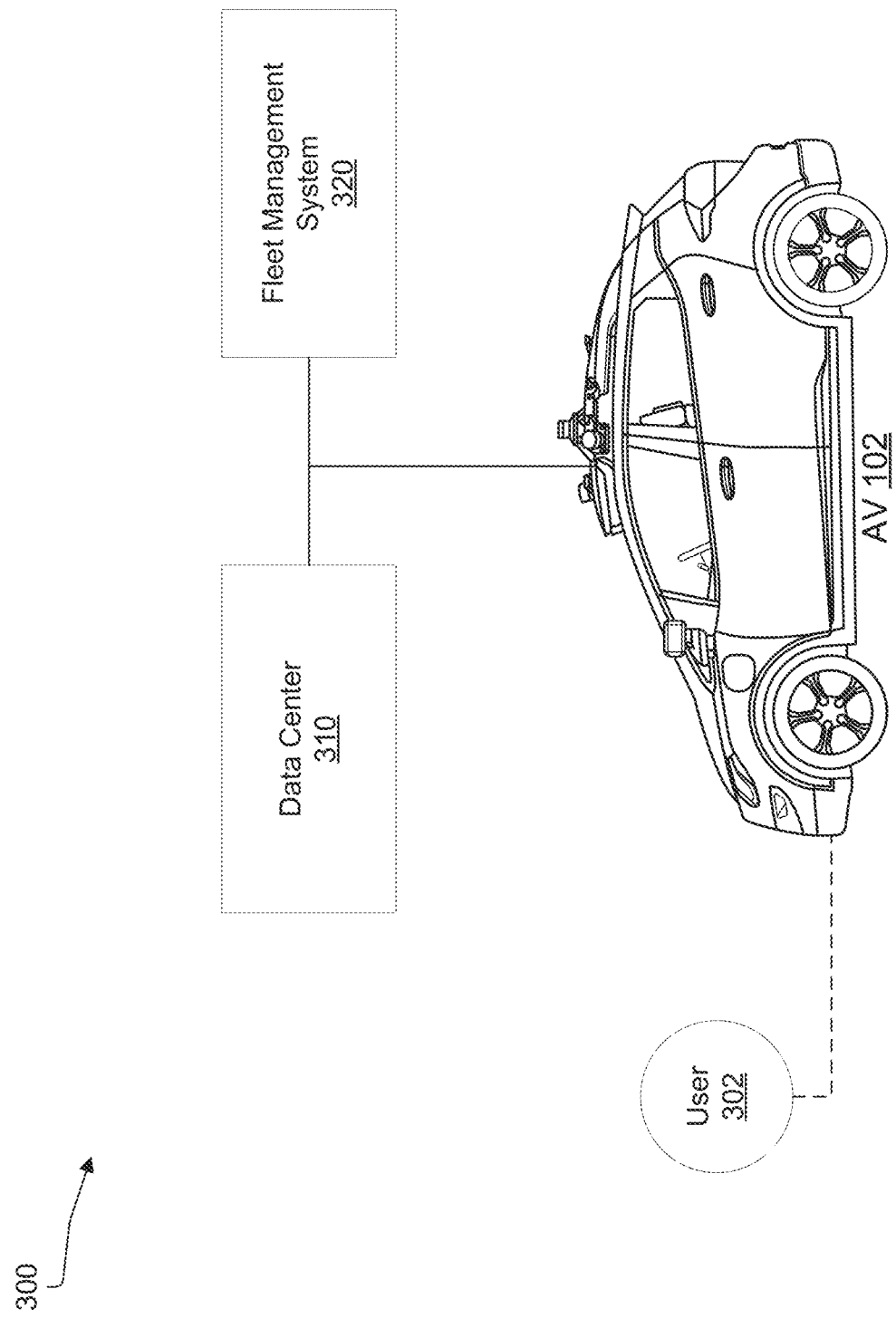
FIG. 3 illustrates an example system for routing and/or dispatching an AV in a flood condition, according to some examples of the present disclosure.

FIG. 3 illustrates an example system 300 for routing and/or dispatching an AV in a flood condition. In some aspects, system 300 may include AV 102, which comprises one or more sensors (e.g., sensor systems 104-108) that generate sensor data. In some examples, system 300 may include data center 310 (similar to data center 150 as illustrated in FIG. 1), which can store various types of data including the sensor data captured by the sensor(s) of AV 102. In some aspects, system 300 may include fleet management system 320, which can manage the routing and/or dispatching of one or more AVs in a fleet (e.g., AV 102). In some examples, system 300 can be part of the internal computing system of AV 102 (similar to local computing device 110 as illustrated in FIG. 1), remote computing system, or a combination thereof.

In some examples, data center 310 is configured to collect and store data from various data sources that can help predict and determine a potential, imminent, or occurring flood event/condition. In some cases, data center 310 can receive and/or store sensor data that is captured by the sensor(s) of AV 102 (e.g., sensor systems 104-108 such as a camera, a LiDAR, a RADAR, a rain gauge, a rain sensor, etc.). As described in connection with FIG. 2, the sensor data can include measurements associated with a level of precipitation (e.g., a water level or an amount of precipitation) on a road.

In some examples, data center 310 can receive fleet data from fleet management system 320. More specifically, fleet management system 320 can provide sensor data that is captured by one or more AVs in a fleet that are navigating on road. The fleet sensor data can enable real-time data collection associated with a flood condition that covers a geographic area on the road.

In some cases, data center 310 can include map data that is descriptive of road geometries, road elements, and/or environmental elements. In some examples, the map data (e.g., a high-definition map) can include details of the road geometries (e.g., 3-dimensional geometry of the road, road shape, etc.), road elements (e.g., semantic information or labels of road elements, shapes of the road elements in 3-D, etc.), and/or any other map data. In some examples, the map data is descriptive of an elevation of ground (e.g., z-levels) that reflects where a higher or lower ground is on a map. In some cases, the map data relating to the elevation of ground can indicate absolute elevation. For example, one geographical area or road/road segment can be higher in elevation than an adjacent area, which may indicate how excess precipitation would flow (e.g., the level of predicted precipitation). In some cases, the map data includes geometric information on road elements such as street gutter, curb, drainage, potholes, etc. For instance, the map data can indicate the height of the curb, the depth of potholes, the size of the drainage, and so on. As follows, when coupled with the measurements associated with a level of precipitation based on the sensor data, the map data can provide the probability of flood (or flood risk) or the progression rate of precipitation at certain locations on a map.

In some examples, data center 310 can include absorbability data that is associated with the capability of the surface of the ground to absorb water. For example, if the ground has a high absorbability and can absorb a lot of water (e.g., rainfalls), then the flood probability can be low and/or the progression rate of precipitation on the ground can be slow. In another example, if the ground has a low absorbability (e.g., ground is saturated) and has a low chance of absorbing water, then the flood probability can be high and/or the progression rate of precipitation on the ground can be high/fast. As follows, the absorbability of the ground coupled with the precipitation level can be used to make a prediction of the precipitation level or water depth (also, the flood probability) on the ground.

In some aspects, data center 310 can include historical data that is indicative of one or more locations, spots, or road segments that are subject to frequent flooding. For example, the historical data can provide zones, areas, locations, spots, or road segments that have been flood-prone in the past. In some cases, data center 310 can further include weather data that is received from third-party weather forecasting organizations (e.g., weather forecasting stations, a National Severe Storms Laboratory (NSSL), etc.).

In some cases, system 300 can leverage a combination of different types of data (e.g., sensor data, fleet data, map data, absorbability data, historical data, and/or third-party weather data as described above) stored in data center 310 to predict and detect a flood condition on road. In some examples, based on a combination of data from various sources, system 300 can determine a progression rate of precipitation (e.g., a rate/pace of precipitation or running water on the surface of the ground) so that more accurate predictions can be made in advance or timely for the safe operation of AV 102.

In some cases, fleet management system 320 can send signals to AV 102 to notify the potential, imminent, or occurring flood condition based on the combination of data available in data center 310 so that AV 102 can be routed/re-routed to avoid certain locations or specific spots that may be affected by a flood condition.

In some aspects, fleet management system 320 and/or AV 102 can generate and/or provide an updated map based on the combination of available data associated with a potential, imminent, or occurring flood condition. A map can be updated continuously as the data in data center 310 can be collected and monitored in real time. In some examples, the updated map can include visualized markings of safe and/or dangerous zones or spots based on the predictions and detection of the flood condition. For example, the updated map can define a zone or a spot that AV 102 should avoid due to the flood condition. In some aspects, the updated map can provide routing information such as indications of impassible (not drivable) roadways or lanes due to the potential, imminent, or occurring flood conditions so that AV 102 can route/re-route its path accordingly. Further, the updated map can show a progression rate of precipitation on road and/or a flood probability or flood risk, which can be calculated based on the combination of data available in data center 310.

Further, in some examples, AV 102 can transmit signals to fleet management system 320 so that one or more AVs (not illustrated) in the fleet can be routed/re-routed to avoid certain locations or specific spots that may be affected by a flood condition. In some examples, the signals to fleet management system 320 can include an updated map that reflects visualized marking of safe or dangerous zones or spots, routing information, a progression rate of precipitation, and/or a flood probability or flood risk as illustrated above.

In some examples, fleet management system 320 and/or data center 310 can, based on the predictions and detection of a flood condition as described above, calibrate or re-calibrate AV 102 to adapt to a potential, imminent, or occurring flood condition. For example, fleet management system 320 can send instructions to AV 102 to adjust a tire pressure, a maximum or minimum speed/acceleration/deceleration rate, braking parameters, steering/turning parameters based on the combination of available data (e.g., the level of precipitation on road, the progression rate of the precipitation/rainfalls, and so on).

In some examples, AV 102 can be associated with a user 302 (e.g., a user with client computing device 170 as illustrated in FIG. 1). For example, system 300 can include a user interface service that can communicate with user 302, for example, via ridehailing application 172 as described in connection with FIG. 1. In some aspects, system 300 (e.g., user interface service) can present visualizations of an updated map that shows potential, imminent, or occurring flood conditions along with a probability of flood risk or a level of precipitation at one or more locations on a map. Further, system 300 (e.g., user interface service) can provide, via ridehailing application 172, in-app interactions such as warnings/alerts, alternative route suggestions, and updated safe spots in real-time (e.g., during a flood condition).

In some aspects, system 300 (e.g., a ridehailing platform 160 as illustrated in FIG. 1) can be configured to interact with client computing device 170 (e.g., ridehailing application 172 that is operating on a device of user 302). In some examples, system 300 can receive requests to be picked up or dropped off and can dispatch an AV (e.g., AV 102 or any other AV) for the requested trip. For example, fleet management system 320 can dispatch an AV in the fleet that is closest to a pick-up location. In some cases, in scheduling a pickup or drop-off or planning the requested trip, system 300 can provide instructions to the dispatched AV to go around any zones, locations, areas, spots, or road segments that are identified to have a potential, imminent, or occurring flood condition. In some aspects, system 300 can determine a pickup or drop-off location, based on the combination of data available in data center 310 (e.g., flood data associated with a flood condition, map data including elevation data, absorbability data, historical data etc.), that minimizes a walking distance between user 302 and the pickup location or between a user destination and the drop-off location to ensure the safety of user 302 in a flood event, for example, based on the level of precipitation.

In some examples, system 300 (e.g., fleet management system 320) can identify a location of user 302 who might be in danger or expected to be affected by a flood event. In some cases, system 300 may transmit an alert signal to a wireless device or user device that is associated with user 302 to notify user 302 of a potential, imminent, or occurring flood condition. In some aspects, system 300 can dispatch an AV (e.g., AV 102 or any AV) to user 302 so that user 302 can evacuate the affected area.

In some aspects, system 300 can allow user 302 to link other users (e.g., family members) on ridehailing application 172 so that location information can be shared during a potential, imminent, or occurring flood event. For example, an alert signal can be sent to user 302 and other users whose accounts are linked together on ridehailing application 172 when one of them is identified to be located in or near an area, zone, or spot that is affected (or likely to be affected) by a flood event. Further, a location of user 302 and the other users can be shared visually on a map so that one's location can be tracked by one another.

Figure 4:
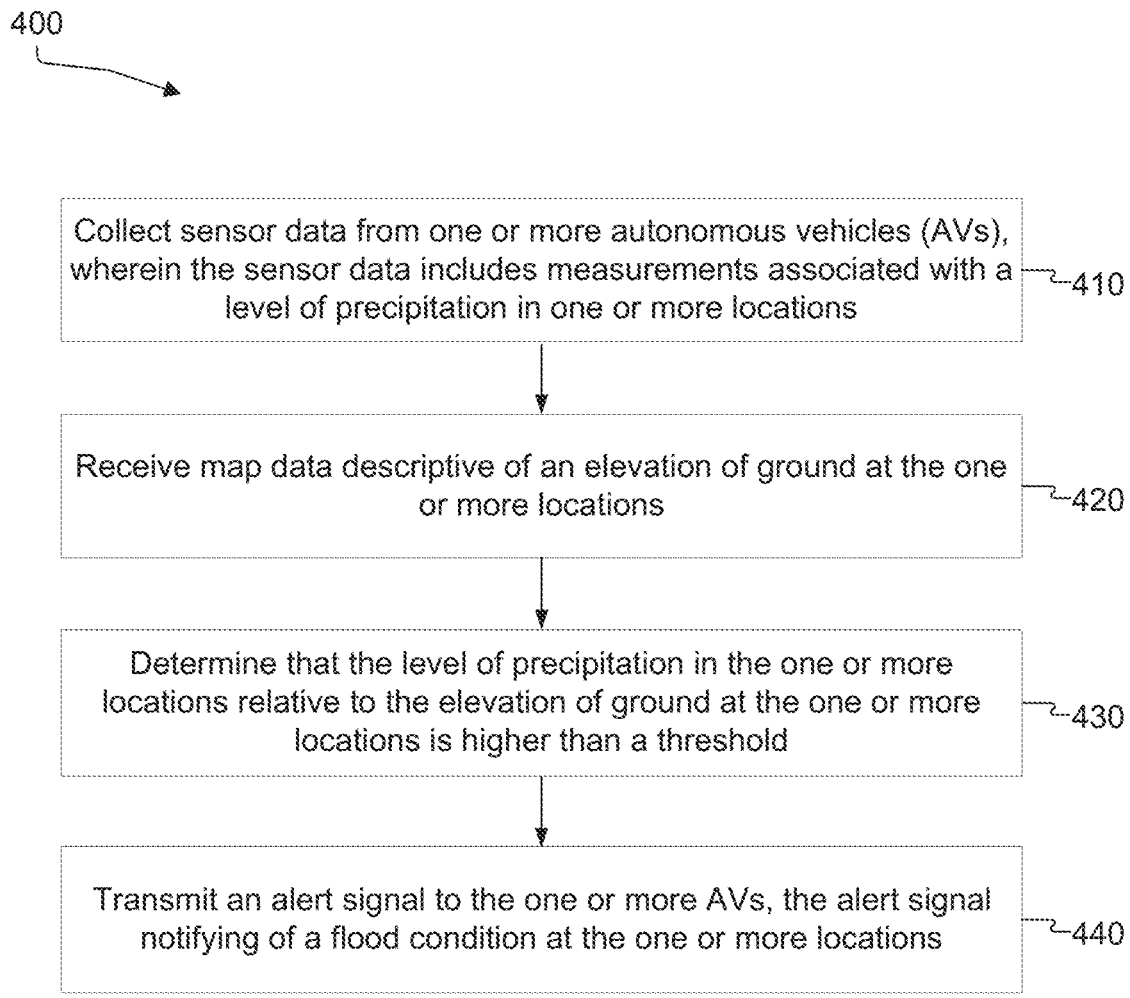
FIG. 4 illustrates an example process for routing an AV in a flood condition, according to some examples of the present disclosure.

FIG. 4 illustrates a flowchart illustrating an example process 400 for routing an AV in a flood condition. Although the example process 400 depicts a particular sequence of operations, the sequence may be altered without departing from the scope of the present disclosure. For example, some of the operations depicted may be performed in parallel or in a different sequence that does not materially affect the function of process 400. In other examples, different components of an example device or system that implements process 400 may perform functions at substantially the same time or in a specific sequence.

At block 410, process 400 can include collecting sensor data from one or more AVs. In some examples, the sensor data can include measurements associated with a level of precipitation in one or more locations. For example, while AV 102 is navigating on a road, various sensors of AV 102

(e.g., sensor systems 104-108) can capture and collect sensor data that includes measurements associated with a level of precipitation (e.g., a water level or an amount of precipitation on the surface of the ground).

At block 420, process 400 can include receiving map data descriptive of an elevation of ground at the one or more locations. More specifically, map data (e.g., a high-definition map) can include 3-D representations of road geometries and road elements that reflect the elevation (in z-level) of the ground. For example, the map data can indicate the size of street gutter 210, the height of the curb above street gutter 210, or the size of potholes 220 as illustrated in FIG. 2. Such information, when coupled with the measurements associated with a level of precipitation based on the sensor data at block 410, can be used to determine a probability of flood (or flood risk) and/or a progression rate of precipitation.

At block 430, process 400 can include determining that the level of precipitation in the one or more locations relative to the elevation of the ground at the one or more locations is higher than a threshold. For example, system 300 can compare the level of precipitation relative to the elevation of ground (e.g., an amount of water or a level of precipitation in potholes 220) against a predetermined precipitation threshold. Further, system 300 can identify one or more locations in which the level of precipitation relative to the ground elevation is higher than a threshold as an area/location in a flood condition.

In some examples, process 400 can include receiving absorbability data indicative of an absorbability of ground from water in the one or more locations, historical data indicative of locations, spots, or road segments that are subject to frequent flooding, third-party weather data providing a status of flood event, and fleet sensor data collected by one or more sensors of AVs in the same fleet as illustrated in connection with FIG. 3.

In some aspects, process 400 can include determining a progression rate of precipitation based on a combination of the sensor data from the one or more AVs, the elevation of ground at the one or more locations, the absorbability data, and the historical data. For example, system 300 can determine a progression rate of precipitation based on a combination of data available in data center 310 including sensor data from AV 102, fleet data from fleet management system 320, map data, historical data, third-party weather data, and any applicable data associated with a flood condition on the road.

At block 440, process 400 can include transmitting an alert signal to the one or more AVs to notify a flood condition at the one or more locations. For example, fleet management system 320 can transmit an alert signal to AV 102 to notify a flood condition in an environment near AV 102 so AV 102 can route/re-route to avoid the locations or spots that are in a flood condition.

Figure 5:
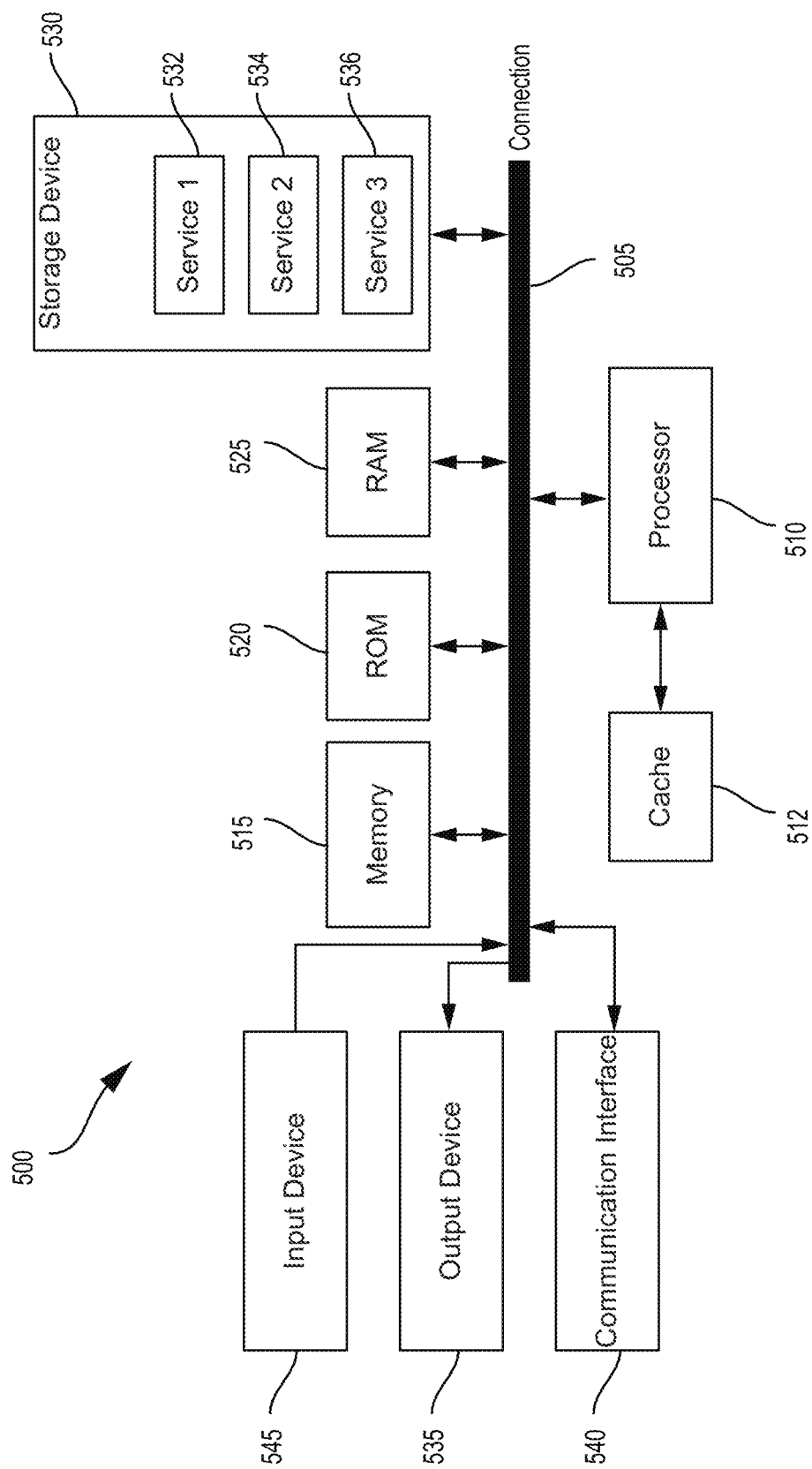
FIG. 5 illustrates an example processor-based system with which some aspects of the subject technology can be implemented.

FIG. 5 illustrates an example processor-based system with which some aspects of the subject technology can be implemented. For example, processor-based system 500 can be any computing device making up, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (Central Processing Unit (CPU) or processor) 510 and connection 505 that couples various system components including system memory 515, such as Read-Only Memory (ROM) 520 and Random-Access Memory (RAM) 525 to processor 510. Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communication interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L#), Resistive RAM (RRAM/ReRAM), Phase Change Memory (PCM), Spin Transfer Torque RAM (STT-RAM), another memory chip or cartridge, and/or a combination thereof.

Storage device 530 can include software services, servers, services, etc., that when the code that defines such software is executed by the processor 510, it causes the system 500 to perform a function. In some embodiments, a hardware service that performs a particular function can include the software component stored in a computer-readable medium in connection with the necessary hardware components, such as processor 510, connection 505, output device 535, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A system comprising: a memory; and one or more processors coupled to the memory, wherein the one or more processors are configured to: collect sensor data from one or more autonomous vehicles (AVs), wherein the sensor data includes measurements associated with a level of precipitation in one or more locations; receive map data descriptive of an elevation of ground at the one or more locations; determine that the level of precipitation in the one or more locations relative to the elevation of ground at the one or more locations is higher than a threshold; and transmit an alert signal to the one or more AVs, the alert signal notifying of a flood condition at the one or more locations.

Aspect 2. The system of Aspect 1, wherein the alert signal includes a visualization of the flood condition at the one or more locations on a map.

Aspect 3. The system of Aspect 1 or 2, wherein the one or more processors are further configured to: receive absorbability data indicative of an absorbability of ground from water in the one or more locations.

Aspect 4. The system of Aspect 3, wherein the one or more processors are further configured to: determine a progression rate of precipitation based on the sensor data from the one or more AVs, the elevation of ground at the one or more locations, and the absorbability data.

Aspect 5. The system of any of Aspects 1 to 4, wherein the one or more processors are further configured to: identify a user associated with at least one AV of the one or more AVs, wherein the user is located within a threshold distance of at least one location of the one or more locations; and dispatch the at least one AV to pick up the user.

Aspect 6. The system of any of Aspects 1 to 5, wherein at least one of the one or more AVs is associated with a ridehail service, and the one or more processors are further configured to: determine a pickup location or a drop-off location that minimizes a walking distance between a user and the pickup location or between a user destination and the drop-off location based on the level of precipitation.

Aspect 7. The system of any of Aspects 1 to 6, wherein the sensor data is captured by a Radio Detection and Ranging (RADAR) sensor of the one or more AVs.

Aspect 8. A method comprising: collecting sensor data from one or more autonomous vehicles (AVs), wherein the sensor data includes measurements associated with a level of precipitation in one or more locations; receiving map data descriptive of an elevation of ground at the one or more locations; determining that the level of precipitation in the one or more locations relative to the elevation of ground at the one or more locations is higher than a threshold; and transmitting an alert signal to the one or more AVs, the alert signal notifying of a flood condition at the one or more locations.

Aspect 9. The method of Aspect 8, wherein the alert signal includes a visualization of the flood condition at the one or more locations on a map.

Aspect 10. The method of Aspect 8 or 9, further comprising: receiving absorbability data indicative of an absorbability of ground from water in the one or more locations.

Aspect 11. The method of Aspect 10, further comprising: determining a progression rate of precipitation based on the sensor data from the one or more AVs, the elevation of ground at the one or more locations, and the absorbability data.

Aspect 12. The method of any of Aspects 8-11, further comprising: identifying a user associated with at least one AV of the one or more AVs, wherein the user is located within a threshold distance of at least one location of the one or more locations; and dispatching the at least one AV to pick up the user.

Aspect 13. The method of any of Aspects 8-12, wherein at least one of the one or more AVs is associated with a ridehail service, and further comprising: determining a pickup location or a drop-off location that minimizes a walking distance between a user and the pickup location or between a user destination and the drop-off location based on the level of precipitation.

Aspect 14. The method of any of Aspects 8-13, wherein the sensor data is captured by a Radio Detection and Ranging (RADAR) sensor of the one or more AVs.

Aspect 15. A non-transitory computer-readable medium having stored thereon instructions which, when executed by one or more processors, cause the one or more processors to: collect sensor data from one or more autonomous vehicles (AVs), wherein the sensor data includes measurements associated with a level of precipitation in one or more locations; receive map data descriptive of an elevation of ground at the one or more locations; determine that the level of precipitation in the one or more locations relative to the elevation of ground at the one or more locations is higher than a threshold; and transmit an alert signal to the one or more AVs, the alert signal notifying of a flood condition at the one or more locations.

Aspect 16. The non-transitory computer-readable medium of Aspect 15, wherein the alert signal includes a visualization of the flood condition at the one or more locations on a map.

Aspect 17. The non-transitory computer-readable medium of Aspects 15 or 16, comprising further instructions configured to cause the computer or the processor to: receive absorbability data indicative of an absorbability of ground from water in the one or more locations.

Aspect 18. The non-transitory computer-readable medium of Aspect 17, comprising further instructions configured to cause the computer or the processor to: determine a progression rate of precipitation based on the sensor data from the one or more AVs, the elevation of ground at the one or more locations, and the absorbability data.

Aspect 19. The non-transitory computer-readable medium of any of Aspects 15-18, comprising further instructions configured to cause the computer or the processor to: identify a user associated with at least one AV of the one or more AVs, wherein the user is located within a threshold distance of at least one location of the one or more locations; and dispatch the at least one AV to pick up the user.

Aspect 20. The non-transitory computer-readable medium of any of Aspects 15-19, wherein at least one of the one or more AVs is associated with a ridehail service, and comprising further instructions configured to cause the computer or the processor to: determine a pickup location or a drop-off location that minimizes a walking distance between a user and the pickup location or between a user destination and the drop-off location based on the level of precipitation.

Aspect 21. An autonomous vehicle comprising: a memory and one or more processors coupled to the memory, the one or more processors being configured to perform a method according to any of Aspects 8 to 14.

Aspect 22. A system comprising means for performing a method according to any of Aspects 8 to 14.

What is claimed is:

1. A system comprising:
   a memory; and
   one or more processors coupled to the memory, wherein the one or more processors are configured to:
   collect sensor data from a Radio Detection and Ranging (RADAR) sensor of one or more autonomous vehicles (AVs), wherein the RADAR sensor measures radar waves that reflect off of precipitation, and wherein the sensor data includes measurements associated with a level of precipitation representing a water level on a ground surface at one or more locations;

receive map data descriptive of an elevation of ground at the one or more locations;

determine that the level of precipitation in the one or more locations relative to the elevation of ground at the one or more locations is higher than a threshold; and transmit an alert signal to the one or more AVs, the alert signal notifying of a flood condition at the one or more locations.

2. The system of claim 1, wherein the alert signal includes a visualization of the flood condition at the one or more locations on a map.

3. The system of claim 1, wherein the one or more processors are further configured to receive absorbability data indicative of an absorbability of ground from water in the one or more locations.

4. The system of claim 3, wherein the one or more processors are further configured to determine a progression rate of precipitation based on the sensor data from the one or more AVs, the elevation of ground at the one or more locations, and the absorbability data.

5. The system of claim 1, wherein the one or more processors are further configured to:

identify a user associated with at least one AV of the one or more AVs, wherein the user is located within a threshold distance of at least one location of the one or more locations; and dispatch the at least one AV to pick up the user.

6. The system of claim 1, wherein at least one of the one or more AVs is associated with a ridehail service, and the one or more processors are further configured to determine a pickup location or a drop-off location that minimizes a walking distance between a user and the pickup location or between a user destination and the drop-off location based on the level of precipitation.

7. A method comprising:

collecting sensor data from a Radio Detection and Ranging (RADAR) sensor of one or more autonomous vehicles (AVs), wherein the RADAR sensor measures radar waves that reflect off of precipitation, and wherein the sensor data includes measurements associated with a level of precipitation representing a water level on a ground surface at one or more locations;

receiving map data descriptive of an elevation of ground at the one or more locations;

determining that the level of precipitation in the one or more locations relative to the elevation of ground at the one or more locations is higher than a threshold; and transmitting an alert signal to the one or more AVs, the alert signal notifying of a flood condition at the one or more locations.

8. The method of claim 7, wherein the alert signal includes a visualization of the flood condition at the one or more locations on a map.

9. The method of claim 7, further comprising receiving absorbability data indicative of an absorbability of ground from water in the one or more locations.

10. The method of claim 9, further comprising determining a progression rate of precipitation based on the sensor data from the one or more AVs, the elevation of ground at the one or more locations, and the absorbability data.

11. The method of claim 7, further comprising:

identifying a user associated with at least one AV of the one or more AVs, wherein the user is located within a threshold distance of at least one location of the one or more locations; and dispatching the at least one AV to pick up the user.

12. The method of claim 7, wherein at least one of the one or more AVs is associated with a ridehail service, and further comprising determining a pickup location or a drop-off location that minimizes a walking distance between a user and the pickup location or between a user destination and the drop-off location based on the level of precipitation.

13. A non-transitory computer-readable medium having stored thereon instructions which, when executed by one or more processors, cause the one or more processors to:

collect sensor data from a Radio Detection and Ranging (RADAR) sensor of one or more autonomous vehicles (AVs), wherein the RADAR sensor measures radar waves that reflect off of precipitation, and wherein the sensor data includes measurements associated with a level of precipitation representing a water level on a ground surface at one or more locations;

receive map data descriptive of an elevation of ground at the one or more locations;

determine that the level of precipitation in the one or more locations relative to the elevation of ground at the one or more locations is higher than a threshold; and transmit an alert signal to the one or more AVs, the alert signal notifying of a flood condition at the one or more locations.

14. The non-transitory computer-readable medium of claim 13, wherein the alert signal includes a visualization of the flood condition at the one or more locations on a map.

15. The non-transitory computer-readable medium of claim 13, comprising further instructions configured to cause the computer or the processor to receive absorbability data indicative of an absorbability of ground from water in the one or more locations.

16. The non-transitory computer-readable medium of claim 15, comprising further instructions configured to cause the computer or the processor to determine a progression rate of precipitation based on the sensor data from the one or more AVs, the elevation of ground at the one or more locations, and the absorbability data.

17. The non-transitory computer-readable medium of claim 13, comprising further instructions configured to cause the computer or the processor to:

identify a user associated with at least one AV of the one or more AVs, wherein the user is located within a threshold distance of at least one location of the one or more locations; and dispatch the at least one AV to pick up the user.

18. The non-transitory computer-readable medium of claim 13, wherein at least one of the one or more AVs is associated with a ridehail service, and comprising further instructions configured to cause the computer or the processor to determine a pickup location or a drop-off location that minimizes a walking distance between a user and the pickup location or between a user destination and the drop-off location based on the level of precipitation.

* * * * *